(12) United States Patent
Ren et al.

(10) Patent No.: US 10,203,992 B2
(45) Date of Patent: Feb. 12, 2019

(54) WORKER NODE REBUILD FOR PARALLEL PROCESSING SYSTEM

(71) Applicant: Futurewei Technologies, Inc., Plano, TX (US)

(72) Inventors: DaQi Ren, Saratoga, CA (US); Jianhuan Wen, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 180 days.

(21) Appl. No.: 15/152,796

(22) Filed: May 12, 2016

(65) Prior Publication Data

US 2017/0329648 A1    Nov. 16, 2017

(51) Int. Cl.
| | |
|---|---|
| *G06F 9/46* | (2006.01) |
| *G06F 9/50* | (2006.01) |
| *H04L 29/06* | (2006.01) |
| *H04L 29/08* | (2006.01) |
| *H04L 29/14* | (2006.01) |

(52) U.S. Cl.
CPC ........ *G06F 9/5083* (2013.01); *H04L 67/1002* (2013.01); *H04L 69/16* (2013.01); *H04L 69/40* (2013.01)

(58) Field of Classification Search
CPC ... G06F 9/5083; H04L 69/16; H04L 67/1002; H04L 69/40
See application file for complete search history.

(56) References Cited

U.S. PATENT DOCUMENTS 5,964,838 A * 10/1999 Cheung ............... G06F 9/52
709/220
7,120,690 B1 * 10/2006 Krishnan .......... G06F 17/30575
707/999.2

(Continued)

FOREIGN PATENT DOCUMENTS

| CN | 103457775 | 12/2013 |
| CN | 104216803 | 12/2014 |
| WO | WO-2016025349 | 2/2016 |

OTHER PUBLICATIONS

"International Application No. PCT/CN2017/082845, International Search Report and Written Opinion dated Jun. 28, 2017", (Jun. 28, 2017), 11 pgs.

*Primary Examiner* — Camquy Truong
(74) *Attorney, Agent, or Firm* — Schwegman Lundberg & Woessner, P.A.

(57) ABSTRACT

A method includes creating communication agents in each worker node in a distributed processing cluster, creating communication agents in nodes other than the distributed processing cluster as redundant nodes, the worker nodes and redundant nodes forming a communicator group, numbering and identifying each worker node in the distributed processing cluster using the communication agents, detecting a distributed processing worker node fault using the communication agent between nodes of the distributed processing cluster, spawning a new worker node via the communication agent from one of the redundant nodes in the communicator group for use as a new worker node, rebuilding the new worker node by using the communication agent to operate with the distributed processing cluster, and starting the new worker node to join the distributed processing cluster to work with the other worker nodes utilizing the communication agents for communications between the worker nodes in the communicator group.

19 Claims, 10 Drawing Sheets

(56) References Cited

U.S. PATENT DOCUMENTS

| | | | |
|---|---|---|---|
| 7,752,421 B2* | 7/2010 | Archer | G06F 9/5066 |
| | | | 712/16 |
| 2010/0185719 A1* | 7/2010 | Howard | G06F 8/45 |
| | | | 709/201 |
| 2014/0047095 A1* | 2/2014 | Breternitz | G06F 9/5072 |
| | | | 709/224 |
| 2015/0149814 A1 | 5/2015 | Ren et al. | |
| 2016/0048415 A1 | 2/2016 | Sarma et al. | |

* cited by examiner

| MPI AGENT<br>IN MASTER NODE | MPI AGENT<br>IN WORKER NODES | MPI AGENT<br>IN REDUNDANT NODES |
|---|---|---|
| HADOOP APPLICATIONS | HADOOP APPLICATIONS | HADOOP APPLICATIONS |
| HADOOP RESOURCE<br>MANAGER<br>A HADOOP MASTER NODE<br><br>LISTEN TO MPI FAILURE<br>REPORT AND DECIDE<br>TO REBUILD A NEW<br>WORKER NODE | HADOOP NODE<br>MANAGER<br>A HADOOP WORKER<br>NODE<br><br>LISTEN TO REPORT AND<br>TRANSFER THE ERROR<br>MESSAGE TO HADOOP<br>MASTER NODE. | HADOOP NODE<br>MANAGER<br>A REDUNDANT NODE<br><br>PRE-INSTALLED AS A<br>WORKER NODE |
| MPI MASTER<br>MONITORING AND REPORT<br>FAILURES TO HADOOP<br>APPLICAITONS | MPI SLAVE<br>MONITORING AND<br>REPORT FAILURES TO<br>HADOOP APPLICAITONS | MPI SLAVE<br>MPI COMMUNICATOR<br>NOT INITIALIZED |
| MPI MASTER<br>MPI COMMUNICATOR<br>INITIALIZED<br>MPI NODE | MPI SLAVE<br>MPI COMMUNICATOR<br>INITIALIZED<br>MPI NODE | MPI SLAVE<br>MPI COMMUNICATOR<br>NOT INITIALIZED<br>MPI NODE |
| OPERATING ENVIRONMENT<br>NETWORK MULTICAST TRANSPORT LAYER: TCP/IP, WIRELESS | | |

WORKER NODE REBUILD FOR PARALLEL PROCESSING SYSTEM

FIELD OF THE INVENTION

The present disclosure is related to parallel processing systems, and in particular to rebuilding worker nodes for fault tolerant parallel processing system.

BACKGROUND

In some programming models for processing and generating large data sets with a parallel, distributed algorithm on a set of connected distributed servers, such as MapReduce, a non-work-conserving detect/restart model is used for fault tolerance. A master node monitors the status of each worker node. Once a failure on a worker node is detected, the master node will reschedule the affected tasks on a different worker node to recover the lost intermediate data. The failed worker node is then removed from the group. The total number of worker nodes is reduced by one. In a large scale system, reducing the number of the worker nodes may decrease the throughput of the entire system.

SUMMARY

A method includes creating communication agents in each worker node in a distributed processing cluster, creating communication agents in nodes other than the distributed processing cluster as redundant nodes, the worker nodes and redundant nodes forming a communicator group, numbering and identifying each worker node in the distributed processing cluster using the communication agents, detecting a distributed processing worker node fault using the communication agent between nodes of the distributed processing cluster, spawning a new worker node via the communication agent from one of the redundant nodes in the communicator group for use as a new worker node in the distributed processing cluster, rebuilding the new worker node by using the communication agent to operate with the distributed processing cluster, and starting the new worker node to join the distributed processing cluster to work with the other worker nodes utilizing the communication agents for communications between the worker nodes in the communicator group.

A computer implemented distributed processing system includes multiple distributed nodes having processing circuitry. Each node has a storage device coupled to the processing circuitry and code stored on the storage device of each node for execution by the processing circuitry to perform operations. The operations include creating communication agents in each worker node in a distributed processing cluster, creating communication agents in nodes other than the distributed processing cluster as redundant nodes, the worker nodes and redundant nodes forming a communicator group, numbering and identifying each worker node in the distributed processing cluster using the communication agents, detecting a distributed processing worker node fault using the communication agent between nodes of the distributed processing cluster, spawning a new worker node via the communication agent from one of the redundant nodes in the communicator group for use as a new worker node in the distributed processing cluster, rebuilding the new worker node by using the communication agent to operate with the distributed processing cluster, and starting the new worker node to join the distributed processing cluster to work with the other worker nodes utilizing the communication agents for communications between the worker nodes in the communicator group.

In some embodiments, a node includes processing circuitry, a storage device coupled to the processing circuitry, and code stored on the storage device for execution by the processing circuitry to perform operations. The code includes a message passing interface (MPI) agent coupled to an MPI communicator group where the MPI agent configured to number and identify the node when it becomes a worker node in a Hadoop cluster of worker nodes. The node is spawnable as a new worker node from the node via the communication agent when a Hadoop worker node is detected as having failed. The MPI agent is configured to rebuild the node as the new worker node operate with the Hadoop cluster. The node is also configured to start as the new worker node to join the Hadoop cluster to work with the other worker nodes utilizing the MPI agent for communications between the worker nodes in the communicator group.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

A framework for a distributed parallel processing system having multiple worker nodes along with a task management and communication mechanism are first described, followed by a description of detecting failed worker nodes, rebuilding them, and replacing them in the system such that failed nodes do not degrade system performance.

Figure 1:
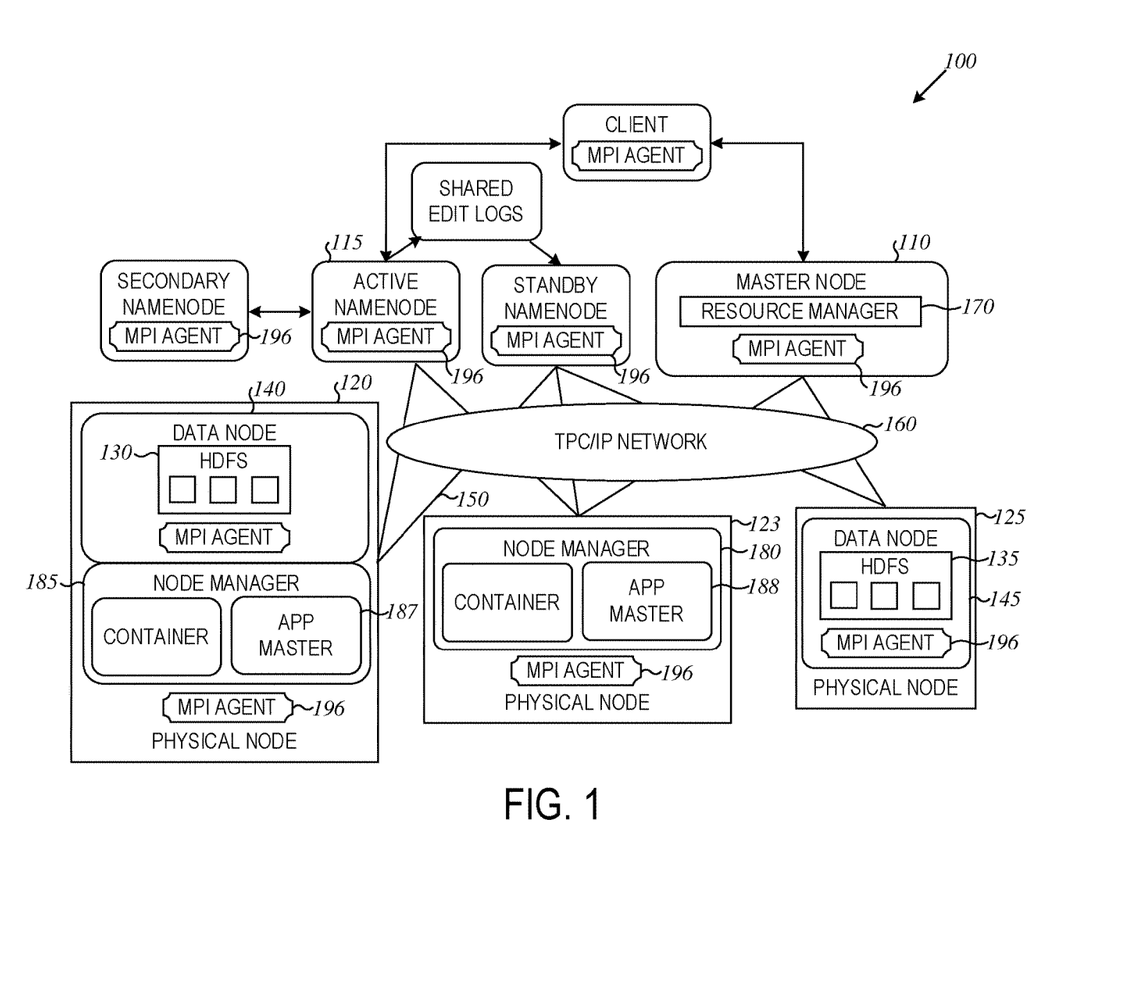
FIG. 1 is a block diagram of a distributed processing system employing message passing interface (MPI) agent and worker node spawning and replacement according to an example embodiment.

MapReduce (Hadoop, when MapReduce is implemented) is an open source software framework as illustrated at 100 in block diagram form in FIG. 1 for distributed storage and distributed processing of very large data sets on nodes indicated at 110, 120, 123 and 125. Node 110 is a master node, while nodes 120, 123 and 125 are representative of multiple worker nodes. A Hadoop distributed file system (HDFS) is a distributed, scalable, and portable file-system indicated at 130 and 135 associated with each node. HDFS may be written in Java for the Hadoop framework 100. A Hadoop cluster has nominally a single namenode indicated as 115 plus multiple datanodes indicated at 140, 145. Redundancy options are available for the namenode. Each datanode 140, 145 serves up blocks of data over the network using a block protocol specific to HDFS. The file system uses TCP/IP (transmission control protocol/internet protocol) sockets 150 for communication via a network 160 such as the Internet. Clients that utilize framework 100 may use remote procedure calls (RPC) to communicate between each other.

HDFS stores large files (typically in the range of gigabytes to terabytes) across multiple machines. HDFS achieves reliability by replicating the data across multiple nodes.

MapReduce in a next generation in Hadoop—0.23 is referred to as MapReduce 2.0 (MRv2) or YARN. Hadoop YARN has a global ResourceManager (RM) and per-application ApplicationMaster (AM). The ResourceManager illustrated at 170 is also a scheduler and is the ultimate authority that arbitrates resources among all the applications in the system. The NodeManager indicated at 180 and 185 is a per-machine framework agent that is responsible for containers, monitoring their resource usage (cpu, memory, disk, network) and reporting the same to the ResourceManager/Scheduler 170.

The per-application ApplicationMaster 187, 188 is, in effect, a framework specific library and is tasked with negotiating resources from the ResourceManager 170 and working with the NodeManager(s) 180, 185 to execute and monitor the tasks. The ResourceManager 170 has two main components: Scheduler and ApplicationsManager. The Scheduler is responsible for allocating resources to the various running applications subject to familiar constraints of capacities, queues etc. The Scheduler is a pure scheduler in the sense that it performs no monitoring or tracking of status for the application. Also, it offers no guarantees about restarting failed tasks either due to application failure or hardware failures. The Scheduler performs its scheduling function based the resource requirements of the applications; it does so based on the abstract notion of a resource Container which incorporates elements such as memory, cpu, disk, network etc.

MapReduce is a programming model and an associated implementation for processing and generating large data sets with a parallel, distributed algorithm on a set of connected distributed servers, also referred to as nodes, worker nodes, or datanodes. Message passing interface (MPI) agents in each node are indicated at 196 have reduce and scatter operations to distribute portions of tasks for execution on the nodes. MPI is a message passing interface with no data locality. Data may be sent between nodes in a parallel processing group of nodes for performance of tasks.

MapReduce-MPI used with the Hadoop Distributed File System, shown as framework 100, duplicates data so that nodes may use local storage such that data is streamed off local storage such as a disk and is provided directly to a processor in a node. MapReduce takes advantage of local storage to avoid network bottlenecks when working with large data.

A MapReduce program may be composed of a Map( ) procedure (method) that performs filtering and sorting (such as for example, sorting a group of people by first name into queues, one queue for each name) and a Reduce( ) method that performs a summary operation (such as for example, counting the number of people in each queue, yielding name frequencies). The "MapReduce System" (also called "infrastructure" or "framework") orchestrates the processing by marshalling the distributed nodes, running the various tasks in parallel, managing all communications and data transfers between the various parts of the system, and providing for redundancy and fault tolerance.

Framework 100 inherits the features of Hadoop, is able to support complex iterative MPI applications, and improves its computing efficiency. MPI helps to monitor and manage Hadoop cluster resources. Computations are performed in parallel and managed by Hadoop compatible runtime libraries. MPI tasks are launched as normal tasks to maximize computing efficiency. The iterative MapReduce framework 100 with MPI has a broad range of potential uses, e.g., it can be used by any application that contains single or multiple MapReduce iterations, and it can invoke serial or parallel (MPI) computations in Hadoop's Map phase or Reduce phase.

MPI managed MapReduce formalism is designed for promoting asynchronous distributed MapReduce processing. Libraries such as MP-MPI are designed based on this approach. It allows MPI to run on each node in a cluster, and drive MPI map and reduce operations to call user-defined map( ) and reduce( ) functions. MPI gives precise control over the memory and format of the data allocated by each processor in a worker node during a MapReduce operation. The MP-MPI Library issues calls to perform a map, reduce or data shuffle operation, which requires all processors to participate in and finish the operation. The MPI in the library remains its traditional mode of MPI_Send and MPI_Recv calls between pairs of processors that use large aggregated messages to improve bandwidth performance and reduce latency costs.

In MapReduce, the non-work-conserving detect/restart model is used for fault tolerance. A master node, such as master node 110, monitors the status of each worker node. Once a failure on a worker node is detected, the master node will reschedule the affected tasks on a different worker node to recover the lost intermediate data. The failed worker node is then removed from the group. The total number of worker nodes is subtracted by one. In a large scale system, reducing the number of the worker nodes may decrease the throughput of the entire system. Embodiments of the present inventive subject matter spawn a new node from a set of reserved nodes and replaces a failed node such that system throughput is maintained.

Figure 2:
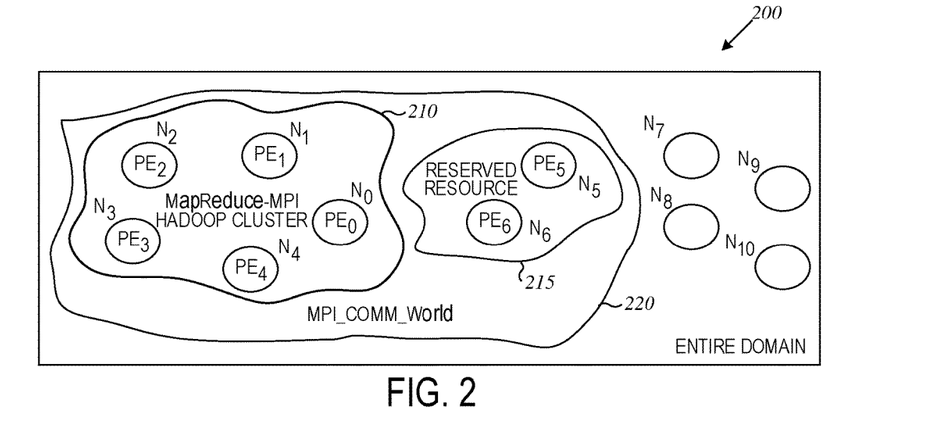
FIG. 2 is a block diagram of a domain that includes a cluster that has five nodes along with two spare nodes according to an example embodiment.

FIG. 2 is a block diagram of a domain 200 that includes a MapReduce-MPI Hadoop cluster 210 that has five nodes ($N_{0-4}$) with processing elements ($PE_{0-4}$). In addition, two reserved resources, nodes $N_{5-6}$ with $PE_{5-6}$ are indicated at 215. The nodes in the cluster 210 and reserve resources 215 are part of a communicator group 220. Each node in the communicator group, including the redundant nodes, has an MPI agent created in them. Each node in the cluster 210 is numbered and identified, using the MPI agents. Domain 200 may also include other nodes indicated a $N_{7-10}$ which are not in the communicator group 220. The nodes in the cluster are fully connected via the IP network.

The network provided TCP connections can last from several hours to several days at a time. Such connections provide an excellent virtual parallel platform for running Hadoop clusters. Heartbeating can be used to check network connectivity in such a virtual cluster: each end of the connections periodically sends a small data packet (a "heartbeat") to its counterpart; if one peer does not receive a heartbeat within a specified period of time, the connection is considered to be broken. The problem is that, TCP itself does not provide heartbeats, and TCP endpoints are not notified of broken connections, preventing higher TCP layers from reacting properly; causing the TCP endpoint to never exit, forever trying to communicate with the unreachable peer. Applications may be reinitialized by higher level applications, such as MPI_INIT. For certain types of computing applications, especially those with high-availability needs, this missing failure notification is a key issue.

The MapReduce-MPI manager 190 of FIG. 1 will employ a number C of nodes (Hadoop cluster) for executing a Hadoop application. And a number of redundant nodes R may be used for backup for any worker node in case a failure happens. As illustrated in the simplified example in FIG. 2, C=5 and R=2.

The master node 110 uses MPI, initializing the communicator group 220 with MPL_COMM_WORLD. A communicator represents a node in an ordered set of nodes initialized by MPI. The master node 110 collects information in turn from all communicators from the distributed system.

Figure 3:
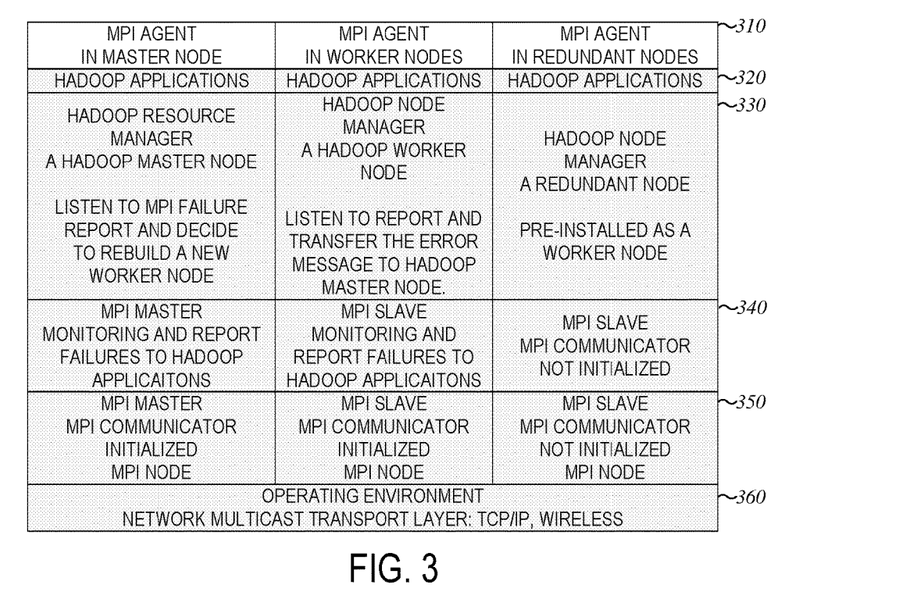
FIG. 3 is a flowchart illustrating a communicator group initialization procedure according to an example embodiment.

MPI Agent 196 is a software agent preinstalled in each node in a cluster. FIG. 3 is a chart illustrating the component and functionalities of the MPI agent at multiple levels. At a level 310, the MPI Agent is installed in master, slave and redundant nodes. At a level 320, each node supports Hadoop applications. At a level 330, in the master node 110, Hadoop resource manager 170 listens to the MPI failure report and decide if and when to rebuild a new worker node. At 330, in worker nodes, the Hadoop node manager 180, 185 listens to reports and transfers the error message to the Hadoop master node 110. At 330, a redundant node is pre-installed as a worker node. At level 340, all MPI slave nodes monitoring the node failure report failures to Hadoop applications. In the redundant node, MPI agents are preinstalled. At level 350, MPI master node 110 and slave nodes are all initialized as MPI communicators. The redundant node with a preinstalled MPI agent, is alive and connected via TCP/IP network 160, but not initialized as an MPI communicator. A bottom level 360 is a distributed operating environment and TPC/IP network which may be a wireless network.

Figure 4:
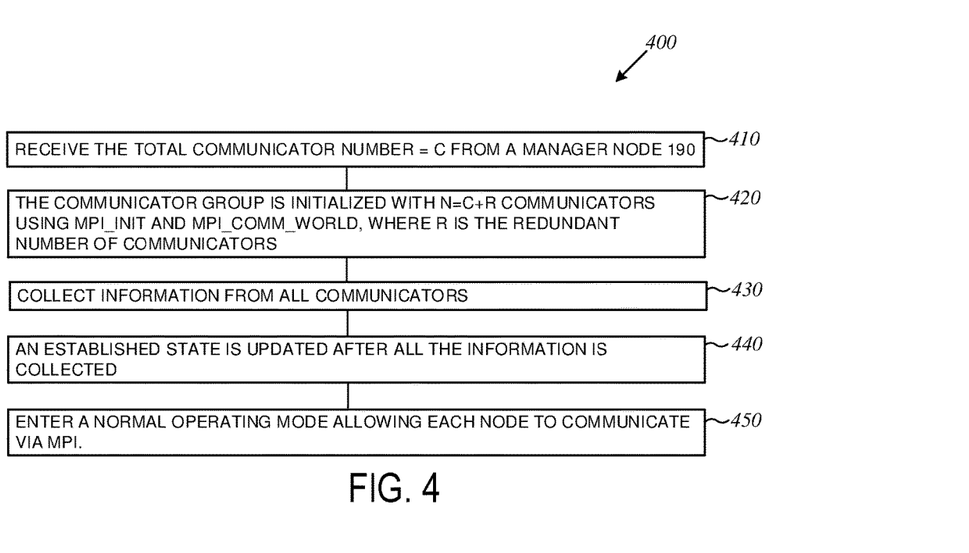
FIG. 4 is a block diagram illustrating a MapReduce-MPI (message passing interface) Hadoop environment according to an example embodiment.

FIG. 4 is a flowchart illustrating a communicator group initialization procedure 400. At 410, the total communicator number=C is received from master node 110. At 420, the communicator group is initialized with n=C+R communicators using MPI_INIT and MPI_COMM_WORLD, where R is the redundant number of communicators. Information from all communicators is collected at 430 and an established state is updated after all the information is collected at 440. At 450, a normal operating mode is entered allowing each node to communicate via MPI.

MapReduce implementation ensures the input data are redundant in multiple nodes. If a node fails, tasks based on the input data can restart on another node that hosts a replica of that data.

MPI uses checkpoints to back up the task status for fault tolerance, which takes periodic system snapshots and stores application status information in persistent storage units. If a failure occurs, the most recent status information can be retrieved and the system recovered from the checkpoints. Checkpoints are saved in a persistent storage unit that is not affected by the failure of a single computing element.

In MapReduce-MPI framework 100, the MPI checkpointing mechanism forms the checkpoints on the master node 110 that writes the data needed to restart the application. Following conventional MPI checkpointing methods: first, the user is responsible for ensuring that all data is saved. The checkpoints are taken at particular points in the program. After recreating the MPI and Hadoop cluster, the process for restoring backed-up data from storage mechanisms such as previous checkpoints can generally employ existing approaches.

MPI has a highly accurate and complete failure detector. An application is notified of a process failure when it attempts to communicate directly or indirectly with the failed process through the return code of the function and the error handler set on the associated communicator. The designed MPI mechanism realizes a recover-and-continue solution that re-spawns only failed processes if an error occurs while keeping living processes within their original processors or nodes.

Figure 5:
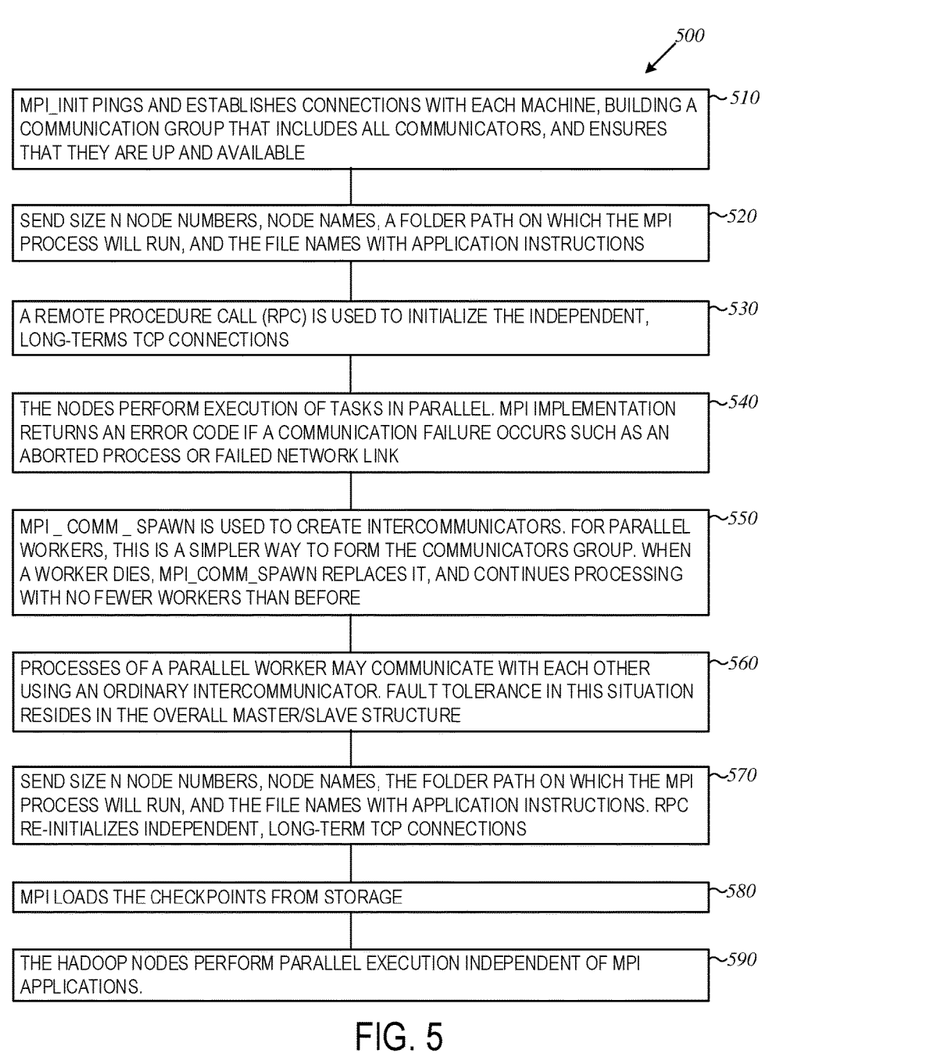
FIG. 5 is a flowchart illustrating an MPI error handler according to an example embodiment.

To minimize the impact of the failure recovery process to the system, in one embodiment, a component, such as an MPI error handler, periodically checks the status of the MPI communicators. If a communicator failure is detected, the MPI will try to re-connect. FIG. 5 is a flowchart illustrating an MPI error handler, MPI_INIT, process 500. At 510, MPI_INIT pings and establishes connections with each machine, building a communication group that includes all communicators, and ensures that they are up and available. At 520, process 500 sends size n node numbers, node names, a folder path on which the MPI process will run, and the file names with application instructions. At 530, a remote procedure call (RPC) is used to initialize the independent, long-terms TCP connections.

At 540, the nodes perform execution of tasks in parallel. Each node can deploy multiple threads. A node is assumed to be failed if the status is down. MPI implementation returns an error code if a communication failure occurs such as an aborted process or failed network link. At 550 MPI_Comm_Spawn is used to create communicators. For parallel workers, this is a simpler way to form the communicator group. When a worker dies, MPI_Comm_spawn replaces it, and continues processing with no fewer workers than before.

At 560, processes of a parallel worker may communicate with each other using an ordinary communicator. Fault tolerance in this situation resides in the overall master/slave structure. At 570, the MPI process 500 sends size n node numbers, node names, the folder path on which the MPI process will run, and the file names with application instructions. RPC re-initializes independent, long-term TCP connections. At 580, MPI loads the checkpoints from storage, and at 590, the Hadoop nodes perform parallel execution independent of MPI applications.

Figure 6:
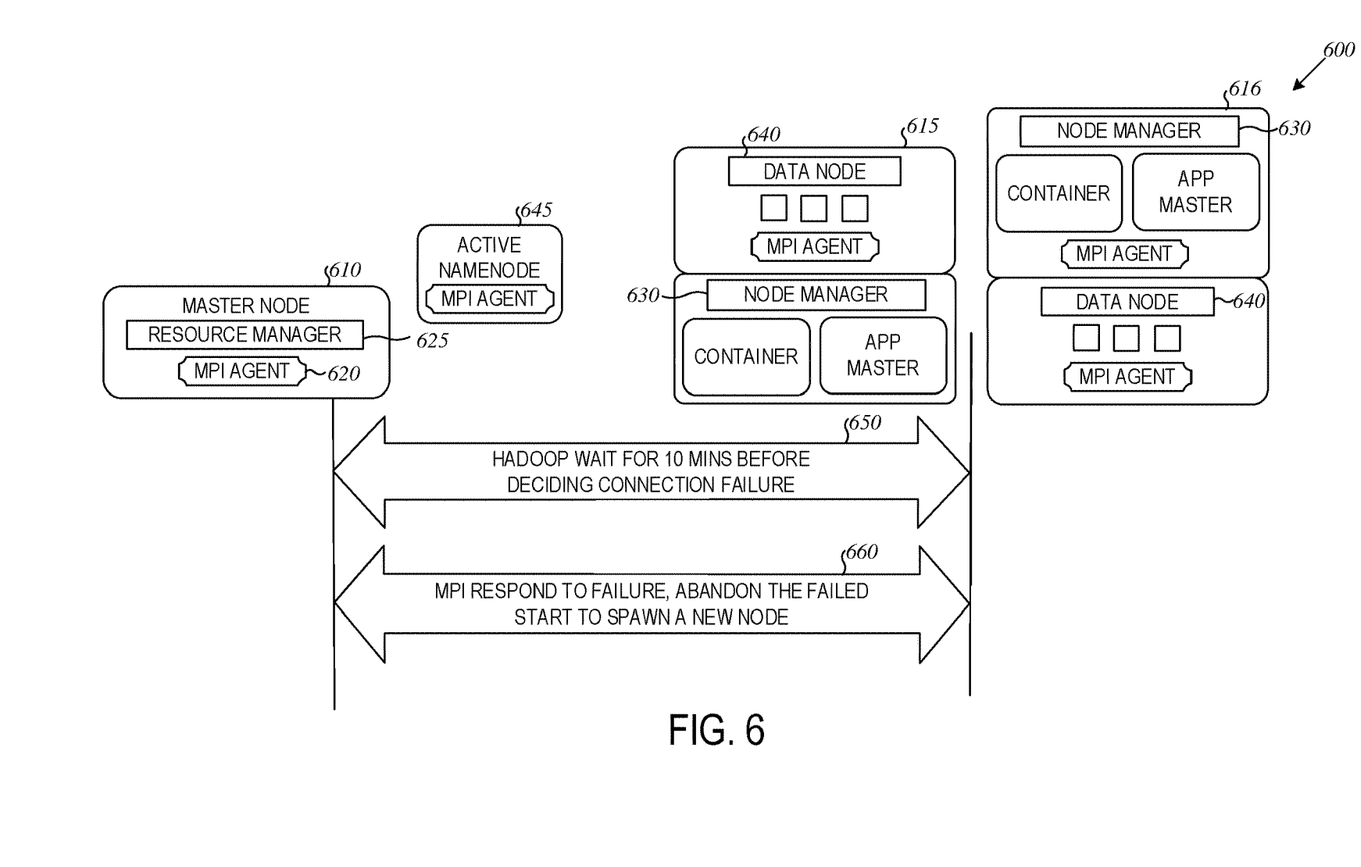
FIG. 6 is a block diagram of a distributed computing system showing the system responds in the events of a failure according to an example embodiment.

At the application layer of MapReduce-MPI framework, Hadoop infers failures by comparing variables against a configurable threshold. FIG. 6 is a block diagram of a distributed computing system 600 showing how Hadoop and MPI respond in the event of a failure. System 600 is shown with a master node 610 and slave nodes represented at 615, 616. The master node 610, as in FIG. 1, includes an MPI agent 620 and Hadoop resource manager 625. The slave nodes include node manager 630, and data nodes 640.

Hadoop constantly updates the variables during the course of a task. Hadoop does not share information about failures among different tasks because HDFS is designed with scalability in mind. To avoid placing an excessive burden on a NameNode 645, most of the functionalities, including failure detection and recovery, are relegated to DataNode 640. Hadoop has no effective way of differentiating congestion from an overload in a communication network, and generally treats them as failure.

Hadoop communication is based on long-term TCP connections. Hadoop can wait for a long time for non-responsive nodes (10 minutes by default) as illustrated at 650. Worker nodes send heartbeats to the Master Nodes every 3 s, which in turn detects worker node failures by checking every 200 s if any worker nodes have not sent a heartbeat for 600 s. If a worker node is declared dead, the tasks running on it at the time of failure restart on other nodes as indicated at 650. Map tasks completed on the dead worker node also restart if the task is still in progress and contains reducers.

Hadoop uses connection errors and timeouts as indicated at 660 to protect against Data Node failures. A new set of source or destination nodes is obtained from the Name Node if a timeout expires or if an existing connection is broken but HDFS operations continue. Both an initial task and an SE task can suffer from timeout; read time outs and connect time outs are based on 60 s, while write time outs are based on 480 s. Differences of 5 s to 15 s in absolute timeout values exist, and depend on the position of a Data Node in the HDFS write pipeline. At 650 MPI responds to a detected failure, abandons the failed node, and spawns a new node.

Figure 7:
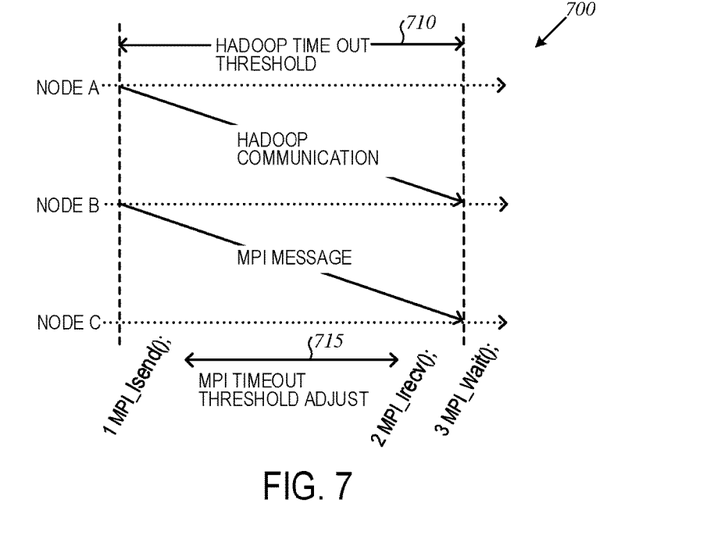
FIG. 7 is a timing diagram illustrating MPI timeout threshold adjustments according to an example embodiment.

FIG. 7 is a timing diagram illustrating MPI timeout threshold adjustments at 700. Different timeout variables use a speculative execution algorithm to detect connection failures that affect Hadoop Data Node and Task Tracker. Timeouts in this case are prudently chosen to accommodate transient congestion episodes that are known to be common in data centers. MPI is more sensitive to connection failures than Hadoop. Even if an MPI_Error is not generated by a timeout, Hadoop's lengthy waiting setting indicated as Hadoop Time out threshold 710 will block the MPI program for 10 minutes by default if the program is using MPI communication blocks such as MPI_Send and MPI_Recv.

To avoid sending MPI_Error messages within Hadoop's timeout threshold for non-time-critical applications, MPI runtime can be adjusted to tolerate Hadoop's waiting time. In this case, the program should employ the following non-blocking point-to-point communication primitives: MPI_Isend, MPI_Irecv and MPI_Iprobe. The timeout threshold 715 of MPI can then be implemented as shown. If pending communications can be cancelled, MPI_Cancel can be used to efficiently free user resources such as send or receive buffers.

Figure 8:
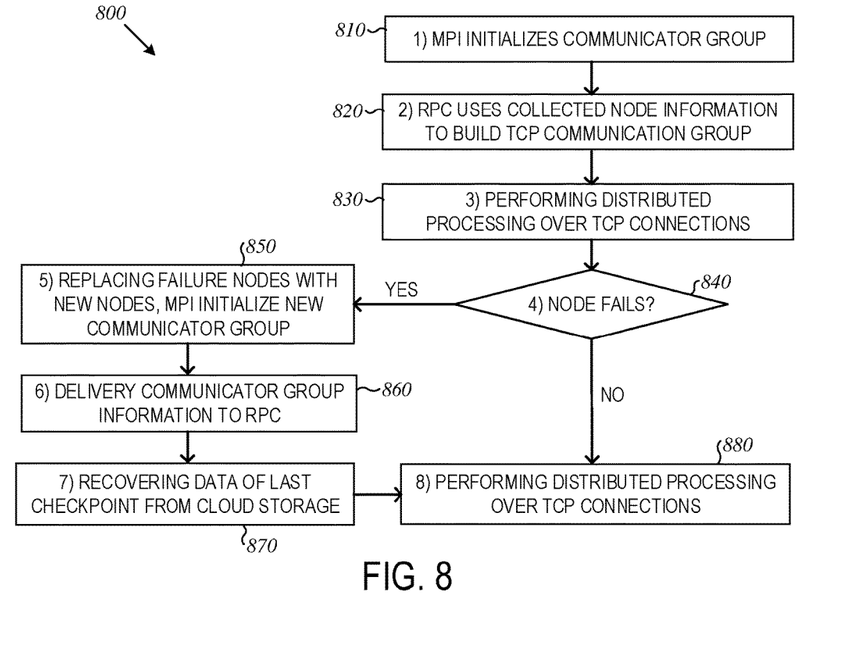
FIG. 8 is a flowchart illustrating a method for worker node rebuild via the MPI agents according to an example embodiment.

FIG. 8 is a flowchart illustrating a method 800 for worker node rebuild via the MPI agents in a MapReduce MPI framework. At 810, MPI initializes the communicator group. RPCs are used at 820 to collect node information to build a TCP communication group. At 830, distributed processing is performed over the TCP connections. A node is detected as failing at 840, and the failed node or nodes are replaced with new nodes at 850. MPI will also initialize a new communicator group at 850 including the new nodes. At 860, the communicator group information is provided to the RPC. At 870, data is recovered from the last checkpoint. The data may be recovered from cloud storage in one embodiment. At 880, distributed processing of the current TCP connections is performed, either based on the new group formed at 850, or if no data nodes failed at 840, from the previous TCP communication group as built at 820. The detection of failed nodes at 840 may be continuous during the performance of the processing to allow real time node failure detection and replacement, as well as initializing new communicator groups responsive to the failures and replacement.

Figure 9:
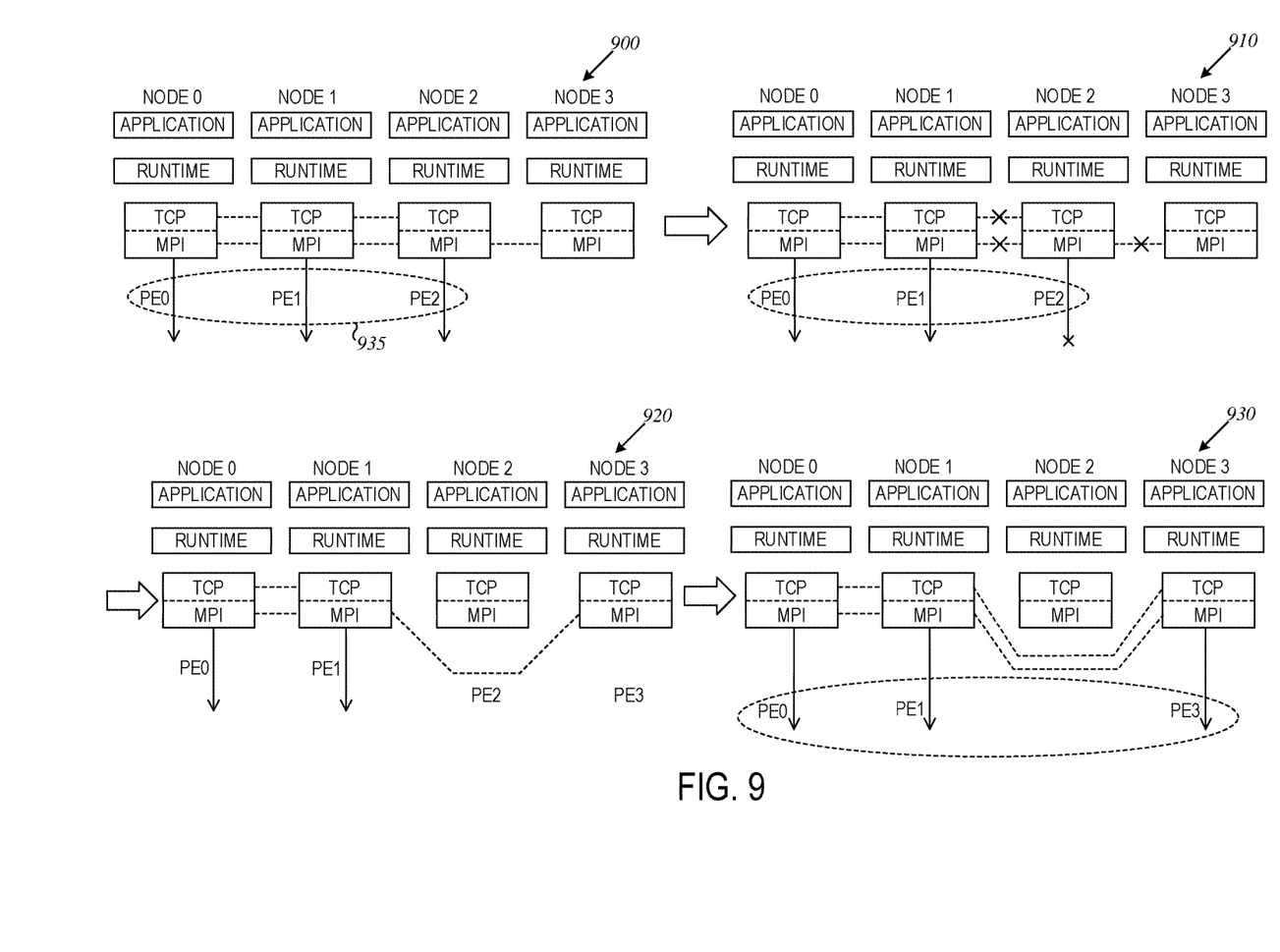
FIG. 9 is a sequence of block diagrams illustrating reconfiguration of Hadoop nodes in a system responsive to detection of a failed node according to an example embodiment.

FIG. 9 is a sequence of block diagrams illustrating reconfiguration of Hadoop nodes in a system 900 responsive to detection of a failed node in a second representation of the system at 910, spawning a new node to replace the failed node at system 920 and reconfiguring and performing parallel executions with the reconfigured node at system 930. System 900 includes four nodes in one embodiment, with three operating in a Hadoop cluster 935 and one node as a reserve. In further embodiments, the system may include many more nodes, such as hundreds or thousands of nodes or more. Each node includes an application to be executed, runtime code, and TCP and MPI communication layers.

MPI_INIT is used to ping and establish connections with each machine/node, build a communication group that includes all communicators, and ensure that they are up and available. The MPI process sends size n node numbers, node names, the folder path on which the MPI process will run, and the file names with application instructions. An RPC initializes the independent, long-terms TCP connections.

The system 900 performs executions in parallel, and each node can deploy multiple threads. A node is assumed to be failed if the status is down. MPI implementation is configured to return an error code if a communication failure occurs such as an aborted process or failed network link.

The master process uses MPI_Comm_Spawn to create intercommunicators. For parallel workers, this is a simpler way to form the communicators group. When a worker dies as indicated in system 910, MPI_Comm_spawn replaces it, and continues processing with no fewer workers than before, as shown at 920 and 940, where node 2 has failed and is replaced by node 3.

The processes of a parallel worker may communicate with each other using an ordinary intercommunicator. Fault tolerance in this situation resides in the overall master/slave structure. The MPI process sends size n node numbers, node names, the folder path on which the MPI process will run at 920, and the file names with application instructions. RPC re-initializes independent, long-term TCP connections at 930. MPI loads the checkpoints from storage. All Hadoop nodes perform parallel executions independent of MPI applications.

Figure 10:
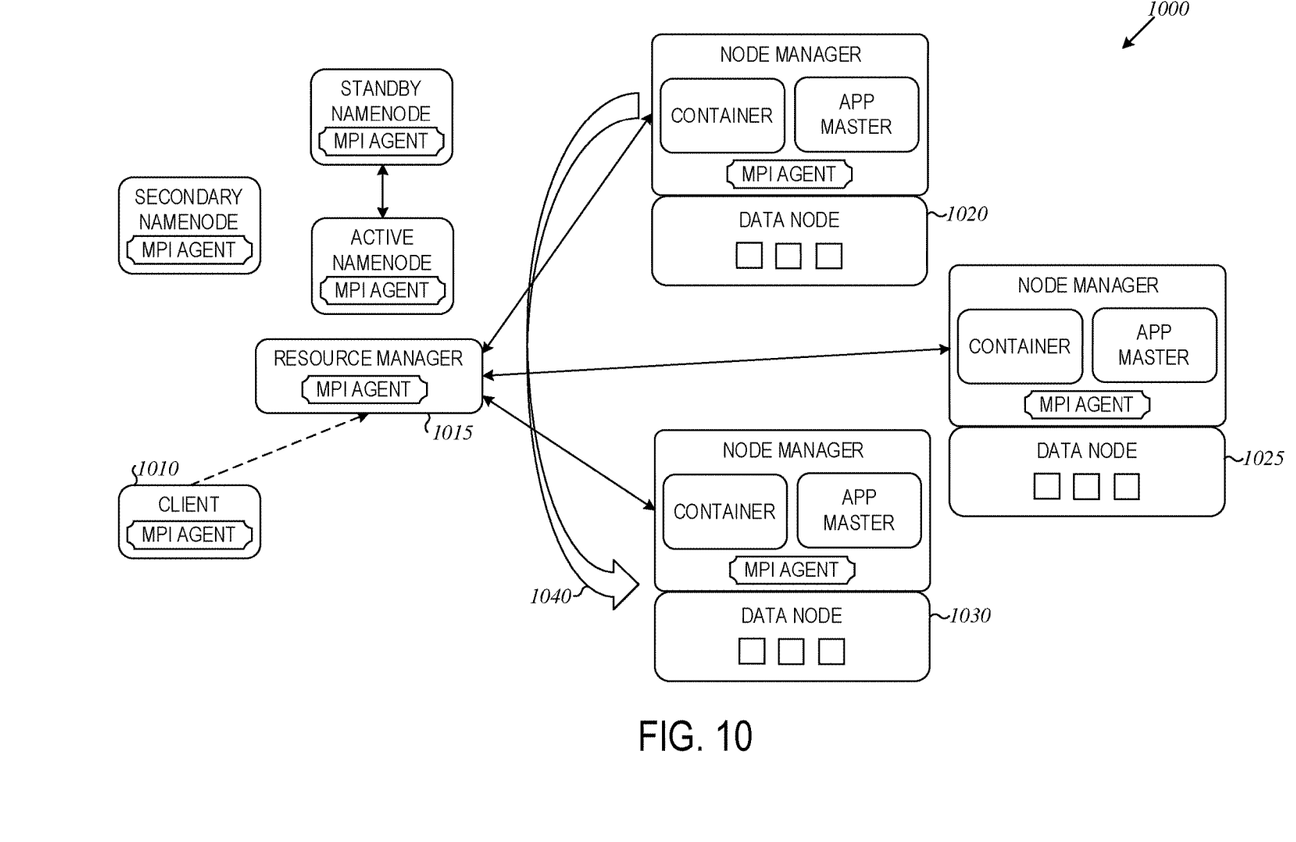
FIG. 10 is a block diagram illustrating replacement of a node from a spare node responsive to detection of a failed node in a Hadoop system according to an example embodiment.

FIG. 10 is a block diagram illustrating replacement of a node from a spare node responsive to detection of a failed node in a Hadoop system 1000. A client 1010 initiates jobs, which are received by a resource manager which serves as a job tracker 1015 running on a namenode or master, that maps tasks to multiple datanodes indicated at 1020, 1025. A node failure is detected corresponding to node 1020 via failure to receive a status update, and a spare node 1030 is used to replace the node 1020 by loading data for the task previously performed by node 1020 as indicated at 1040 via the MPI channel, along with updating a communicator group. Spare node 1030 also sends status updates along with the original node 1025 for detection of failed nodes.

Figure 11:
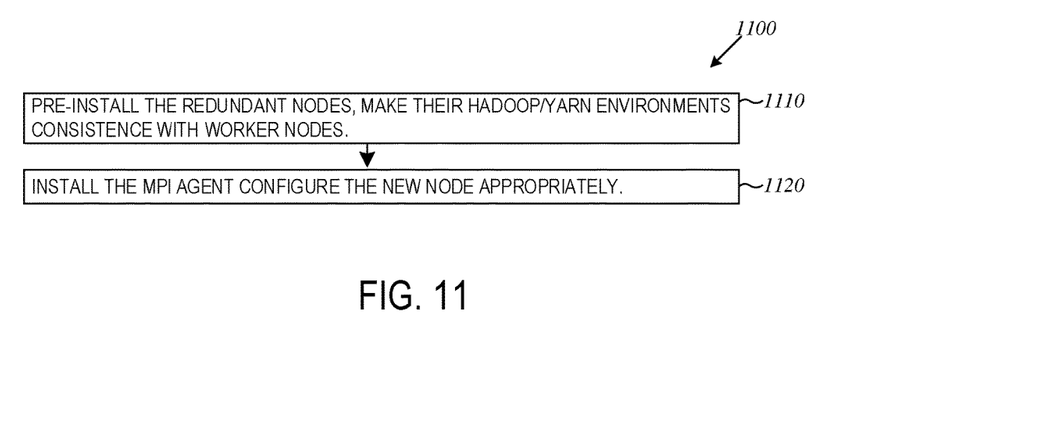
FIG. 11 is flowchart illustrating a method to configure new worker nodes that have been spawned to replace failed worker nodes according to an example embodiment.

FIG. 11 is a flowchart illustrating a method 1100 to setup a redundant node to configure the redundant node as a new worker node. At 1110, The redundant node is pre-installed and pre-configured with the same Hadoop/Yarn environment like a worker node. That makes the environments consistent within all the worker nodes and redundant nodes in the cluster. At 1120, The MPI agent is installed in the redundant node to configure the new node.

Figure 12:
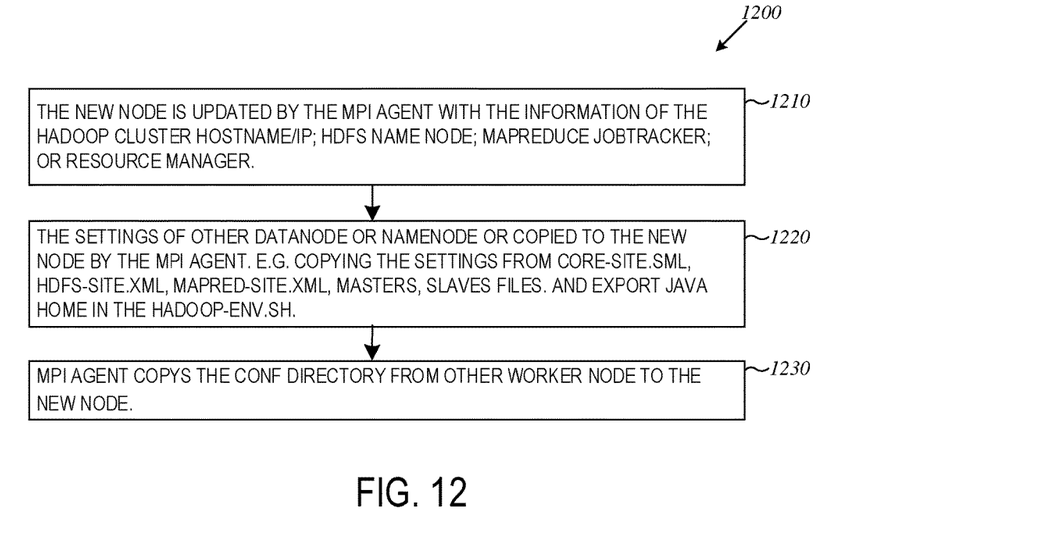
FIG. 12 is a flowchart illustrating a method to configure a redundant node to become a new worker node according to an example embodiment.

FIG. 12 is a flowchart illustrating a method 1200 to configure a redundant node to become a new worker node. This happens after the redundant node is spawned as a potential new worker node in the communicator group. Hadoop's Java configuration is driven by two types of important configuration files, a read-only default configuration—core-default.xml, hdfs-default.xml, yarn-default.xml and mapred-default.xml and a site-specific configuration—etc/hadoop/core-site.xml, etc/hadoop/hdfs-site.xml, etc/hadoop/yarn-site.xml and etc/hadoop/mapred-site.xml Control of the Hadoop scripts found in a bin/directory of the distribution is done by setting site-specific values via the etc/hadoop/hadoop-env.sh and etc/hadoop/yarn-env.sh files. To configure the Hadoop cluster, the environment in which the Hadoop daemons execute is configured as well as obtaining configuration parameters for the Hadoop daemons.

HDFS daemons are NameNode, SecondaryNameNode, and DataNode. YARN damones are ResourceManager, NodeManager, and WebAppProxy. If MapReduce is to be used, then the MapReduce Job History Server will also be running. For large installations, these are generally running on separate hosts.

At 1210 the new node is updated by the MPI agent with the information of the Hadoop cluster hostname/ip; HDFS name node; MapReduce jobtracker; or Resource Manager. The Hostname/IP of the existing HDFS NameNode and MR Jobtracker (Resource manager in YARN) are configured.

At 1220, the settings of other DataNode or NameNode are copied to the new node by the MPI agent, e.g., copying the settings from core-site.xml, hdfs-site.xml, mapred-site.xml, masters, slaves files. And export java home in the hadoop-env.sh.

At 1230, an MPI agent copies the conf directory from other worker node to the new node.

Figure 13:
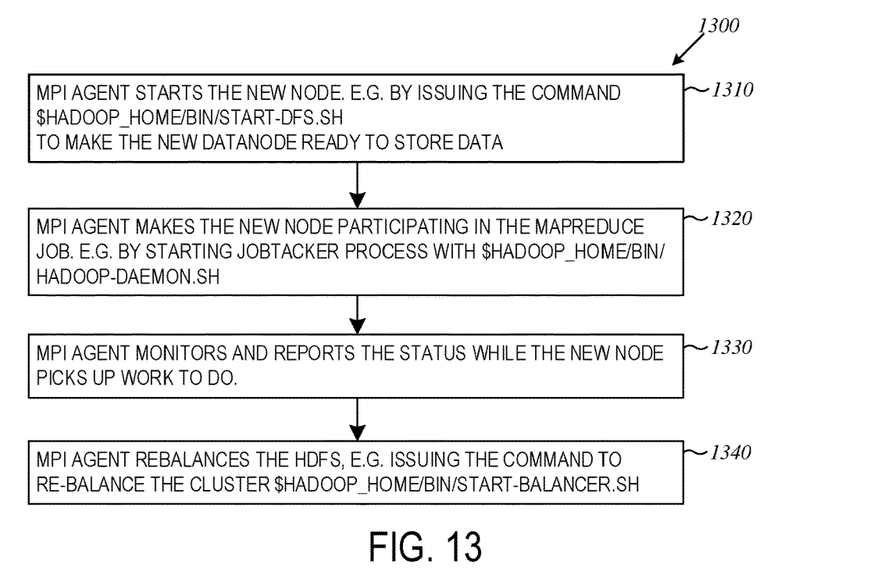
FIG. 13 is a flowchart illustrating a method to include a new worker node into the Hadoop cluster according to an example embodiment.

FIG. 13 is a flowchart illustrating a method 1300 to include a new worker node into the Hadoop cluster and to start a redundant node as a worker node.

At 1310, the MPI agent starts the new node, e.g., by issuing the command $hadoop_home/bin/start-dfs.sh to make the new datanode ready to store data.

At 1320, the MPI agent makes the new node participating in the mapreduce job, e.g., by starting jobtacker process with $hadoop_home/bin/hadoop-deamon.sh.

At 1330, the MPI agent monitors and reports the status while the new node picks up work to do.

At 1340, the MPI agent rebalances the hdfs, e.g., issuing the command to re-balance the cluster $hadoop_home/bin/start-balancer.sh.

Figure 14:
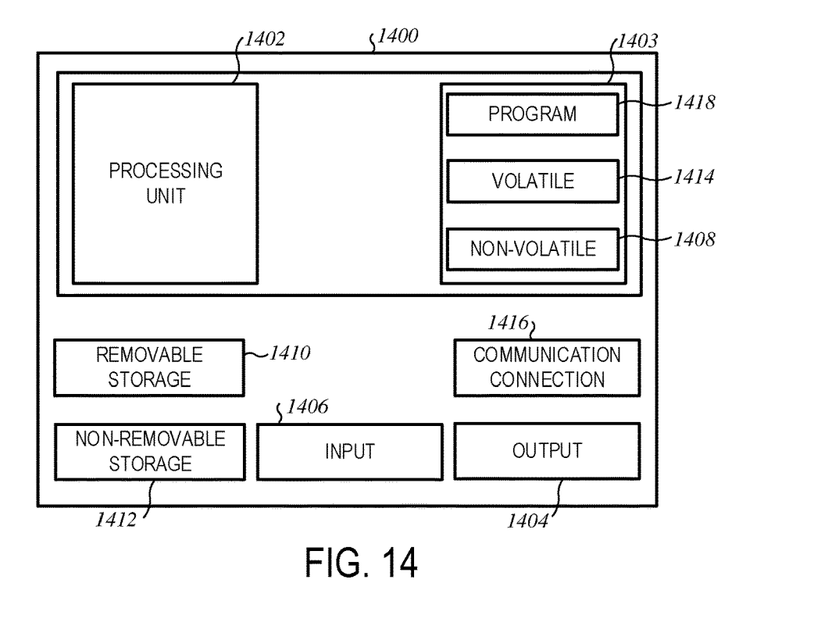
FIG. 14 is a block diagram illustrating circuitry for nodes for implementing algorithms and performing methods according to example embodiments.

FIG. 14 is a block diagram illustrating circuitry for nodes in a distributed processing system for implementing algorithms and performing methods according to example embodiments. All components need not be used in various embodiments. For example, the clients, servers, and network resources may each use a different set of components, or in the case of servers for example, larger storage devices.

One example computing device in the form of a computer 1400 may include a processing unit 1402, memory 1403, removable storage 1410, and non-removable storage 1412. Although the example computing device is illustrated and described as computer 1400, the computing device may be in different forms in different embodiments. For example, the computing device may instead be a node in a distributed processing system, a smartphone, a tablet, smartwatch, or other computing device including the same or similar elements as illustrated and described with regard to FIG. 14. Devices, such as smartphones, tablets, and smartwatches, are generally collectively referred to as mobile devices or user equipment. Further, although the various data storage elements are illustrated as part of the computer 1400, the storage may also or alternatively include cloud-based storage accessible via a network, such as the Internet or server based storage.

Memory 1403 may include volatile memory 1414 and non-volatile memory 1408. Computer 1400 may include—or have access to a computing environment that includes—a variety of computer-readable media, such as volatile memory 1414 and non-volatile memory 1408, removable storage 1410 and non-removable storage 1412. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 1400 may include or have access to a computing environment that includes input 1406, output 1404, and a communication connection 1416. Output 1404 may include a display device, such as a touchscreen, that also may serve as an input device. The input 1406 may include one or more of a touchscreen, touchpad, mouse, keyboard, camera, one or more device-specific buttons, one or more sensors integrated within or coupled via wired or wireless data connections to the computer 1400, and other input devices. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN), cellular, WiFi, Bluetooth, or other networks.

Computer-readable instructions stored on a computer-readable medium are executable by the processing unit 1302 of the computer 1300. A hard drive, CD-ROM, and RAM are some examples of articles including a non-transitory computer-readable medium such as a storage device. The terms computer-readable medium and storage device do not include carrier waves to the extent carrier waves are deemed too transitory. For example, a computer program 1418 capable of providing a generic technique to perform access control check for data access and/or for doing an operation on one of the servers in a component object model (COM) based system may be included on a CD-ROM and loaded from the CD-ROM to a hard drive. The computer-readable instructions allow computer 1300 to provide generic access controls in a COM based computer network system having multiple users and servers. Storage can also include networked storage such as a storage area network (SAN) indicated at 1420.

EXAMPLES

1. In example 1, a method includes creating communication agents in each worker node in a distributed processing cluster, creating communication agents in nodes other than the distributed processing cluster as redundant nodes, the worker nodes and redundant nodes forming a communicator group, numbering and identifying each worker node in the distributed processing cluster using the communication agents, detecting a distributed processing worker node fault using the communication agent between nodes of the distributed processing cluster, spawning a new worker node via the communication agent from one of the redundant nodes in the communicator group for use as a new worker node in the distributed processing cluster, rebuilding the new worker node by using the communication agent to operate with the distributed processing cluster, and starting the new worker node to join the distributed processing cluster to work with the other worker nodes utilizing the communication agents for communications between the worker nodes in the communicator group.

2. The method of example 1 wherein the distributed processing cluster comprises a Hadoop cluster.

3. The method of example 2 wherein the communication agents comprise message passing interface (MPI) agents and wherein the communicator group comprises an MPI communicator group.

4. The method of example 3 and further creating an application manager in the new node using MPI, and comprising distributing an application for execution by the worker nodes in the communicator group.

5. The method of any of examples 3-4 wherein the message passing interface uses an MPI function to copy, modify and edit the files in the new spawn worker node.

6. The method of any of examples 1-5 wherein spawning the new worker node further comprises determining a type of worker node to spawn.

7. The method of any of examples 1-6 and further including receiving a transaction, generating tasks to perform the transaction, and distributing the tasks for execution to the worker nodes in the communicator group including the new worker node.

8. The method of any of examples 1-7 and further comprising using a message passing interface (MPI) in each node to perform operations including starting a Node Manager as a Service via commands or scripts, editing Node Manager Environment Variables, and modifying Node Manager Properties.

9. In example 9, a computer implemented distributed processing system includes multiple distributed nodes having processing circuitry. Each node has a storage device coupled to the processing circuitry and code stored on the storage device of each node for execution by the processing circuitry to perform operations. The operations include creating communication agents in each worker node in a distributed processing cluster, creating communication agents in nodes other than the distributed processing cluster as redundant nodes, the worker nodes and redundant nodes forming a communicator group, numbering and identifying each worker node in the distributed processing cluster using the communication agents, detecting a distributed processing worker node fault using the communication agent between nodes of the distributed processing cluster, spawning a new worker node via the communication agent from one of the redundant nodes in the communicator group for use as a new worker node in the distributed processing cluster, rebuilding the new worker node by using the communication agent to operate with the distributed processing cluster, and starting the new worker node to join the distributed processing cluster to work with the other worker nodes utilizing the communication agents for communications between the worker nodes in the communicator group.

10. The distributed processing system of example 9 wherein the distributed processing cluster comprises a Hadoop cluster.

11. The distributed processing system of example 10 wherein the new node is one of multiple redundant nodes that have pre-installed Hadoop software that is consistent with the worker nodes.

12. The distributed processing system of example 11 wherein each node, including worker node and redundant node, in the communicator group comprises a TCP/IP connection to a network, and wherein the communication agents utilize a message passing interface to pass messages to a distributed computing system manager via the network.

13. The method of any of examples 10-12 wherein the communication agents comprise message passing interface (MPI) agents and wherein the communicator group comprises an MPI communicator group.

14. The distributed processing system of example 13 wherein the message passing interface uses an MPI_Comm_spawn function to spawn the new worker node and wherein spawning the new worker node further comprises determining a type of worker node to spawn.

15. The distributed processing system of any of examples 9-14 wherein the operations further include receiving a transaction, generating tasks to perform the transaction, and distributing the tasks for execution to the worker nodes in the communicator group including the new worker node.

16. A node includes processing circuitry, a storage device coupled to the processing circuitry, and code stored on the storage device for execution by the processing circuitry to perform operations. The code includes a message passing interface (MPI) agent coupled to an MPI communicator group, the MPI agent configured to number and identify the node when it becomes a worker node in a Hadoop cluster of worker nodes, the node being spawnable as a new worker node from the node via the communication agent when a Hadoop worker node is detected as having failed, the MPI agent configured to rebuild the node as the new worker node operate with the Hadoop cluster, and the node configured to start as the new worker node to join the Hadoop cluster to work with the other worker nodes utilizing the MPI agent for communications between the worker nodes in the communicator group.

17. The node of example 16 wherein the MPI agent uses an MPI_Comm_spawn function to spawn the new worker node and wherein spawning the new worker node further comprises determining a type of worker node to spawn.

18. The node of any of examples 16-17 wherein the MPI agent configures the new node with a hostname/IP of an existing Hadoop Distributed File System (HDFS) namenode and MapReduce (MR) jobtracker or resource manager.

19. The node of any of examples 16-18 wherein the code further comprises an application master to manage tasks executing on the node when it becomes a worker node.

20. The node of any of examples 16-19 wherein the code executing on the circuitry performs further operations comprising receiving a task from a job tracker, or from a resource manager running on a master node of the Hadoop cluster for execution.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A method comprising:
   creating communication agents in each worker node in a distributed processing cluster;
   creating communication agents in nodes not in the distributed processing cluster as redundant nodes, the worker nodes and redundant nodes forming a communicator group;
   numbering and identifying each worker node in the distributed processing cluster using the communication agents;
   detecting a distributed processing worker node fault using the communication agents;
   spawning a new worker node via the communication agent from one of the redundant nodes in the communicator group for use as a new worker node in the distributed processing cluster;
   rebuilding the new worker node by using the communication agents to operate with the distributed processing cluster;
   starting the new worker node to join the distributed processing cluster to work with the other worker nodes utilizing the communication agents for communications between the worker nodes in the communicator group; and
   using a message passing interface (MPI) in each node to perform operations comprising:
      starting a Node Manager as a Service via commands or scripts;
      editing Node Manager Environment Variables; and
      modifying Node Manager Properties.

2. The method of claim 1 wherein the distributed processing cluster comprises a Hadoop cluster.

3. The method of claim 2 wherein the communication agents comprise MPI agents and wherein the communicator group comprises an MPI communicator group.

4. The method of claim 3 and further creating an application manager in the new worker node using MPI, and comprising distributing an application for execution by the worker nodes in the communicator group.

5. The method of claim 3 wherein the message passing interface uses an MPI function to copy, modify and edit files in the spawned new worker node.

6. The method of claim 1 wherein spawning the new worker node further comprises determining a type of worker node to spawn.

7. The method of claim 1 and further comprising:
   receiving a transaction;
   generating tasks to perform the transaction; and
   distributing the tasks for execution to the worker nodes in the communicator group including the new worker node.

8. A computer implemented distributed processing system comprising:
   multiple distributed nodes having processing circuitry;
   each node having a storage device coupled to the processing circuitry; and
   code stored on the storage device of each node for execution by the processing circuitry to perform operations comprising:
      creating communication agents in each worker node in a distributed processing cluster;
      creating communication agents in nodes other than the distributed processing cluster as redundant nodes; the worker nodes and redundant nodes forming a communicator group;
      numbering and identifying each worker node in the distributed processing cluster using the communication agents;
      detecting a distributed processing worker node fault using the communication agents;
      spawning a new worker node via the communication agents from one of the redundant nodes in the communicator group for use as a new worker node in the distributed processing cluster;
      rebuilding the new worker node by using the communication agents to operate with the distributed processing cluster;
      starting the new worker node to join the distributed processing cluster to work with the other worker nodes utilizing the communication agents for communications between the worker nodes in the communicator group; and
      using a message passing interface (MPI) in each node to perform operations comprising:
         starting a Node Manager as a Service via commands or scripts;
         editing Node Manager Environment Variables and modifying Node Manager Properties.

9. The distributed processing system of claim 8 wherein the distributed processing cluster comprises a Hadoop cluster.

10. The distributed processing system of claim 9 wherein the new worker node is one of multiple redundant nodes that have pre-installed Hadoop software that is consistent with the worker nodes.

11. The distributed processing system of claim 10 wherein each node, including worker node and redundant node, in the communicator group comprises a TCP/IP connection to a network, and wherein the communication agents utilize an MPI to pass messages to a distributed computing system manager via the network.

12. The distributed processing system of claim 9 wherein the communication agents comprise MPI agents and wherein the communicator group comprises an MPI communicator group.

13. The distributed processing system of claim 12 wherein the message passing interface uses an MPI_Comm_spawn function to spawn the new worker node and wherein spawning the new worker node further comprises determining a type of worker node to spawn.

14. The distributed processing system of claim 8 wherein the operations further comprise:
receiving a transaction;
generating tasks to perform the transaction; and
distributing the tasks for execution to the worker nodes in the communicator group including the new worker node.

15. A node comprising:
a storage device that stores instructions; and
processing circuitry configured to execute the instructions to perform operations comprising:
providing a message passing interface (MPI) agent coupled to an MPI communicator group, the MPI agent configured to number and identify the node when it becomes a worker node in a Hadoop cluster of worker nodes;
when a Hadoop worker node is detected as having failed, spawning the node as a new worker node via the MPI agent, the MPI agent configured to rebuild the node as the new worker node to operate with the Hadoop cluster, the new worker node using the MPI agent to communicate with other worker nodes in the MPI communicator group; and
using an MPI to perform operations comprising:
starting a Node Manager as a Service via commands or scripts;
editing Node Manager Environment Variables; and
modifying Node Manager Properties.

16. The node of claim 15 wherein the MPI agent uses an MPI_Comm_spawn function to spawn the new worker node and wherein spawning the new worker node further comprises determining a type of worker node to spawn.

17. The node of claim 15 wherein the MPI agent configures the new worker node with a hostname/IP of an existing Hadoop Distributed File System (HDFS) namenode and MapReduce (MR) jobtracker or resource manager.

18. The node of claim 15 wherein the operations further comprise providing an application master to manage tasks executing on the node when it becomes the new worker node.

19. The node of claim 15 wherein the operations further comprise receiving a task from a job tracker or from a resource manager running on a master node of the Hadoop cluster for execution.

* * * * *